H. C. ANDERSON.
ELEVATOR.
APPLICATION FILED MAY 10, 1918.
1,413,886. Patented Apr. 25, 1922.
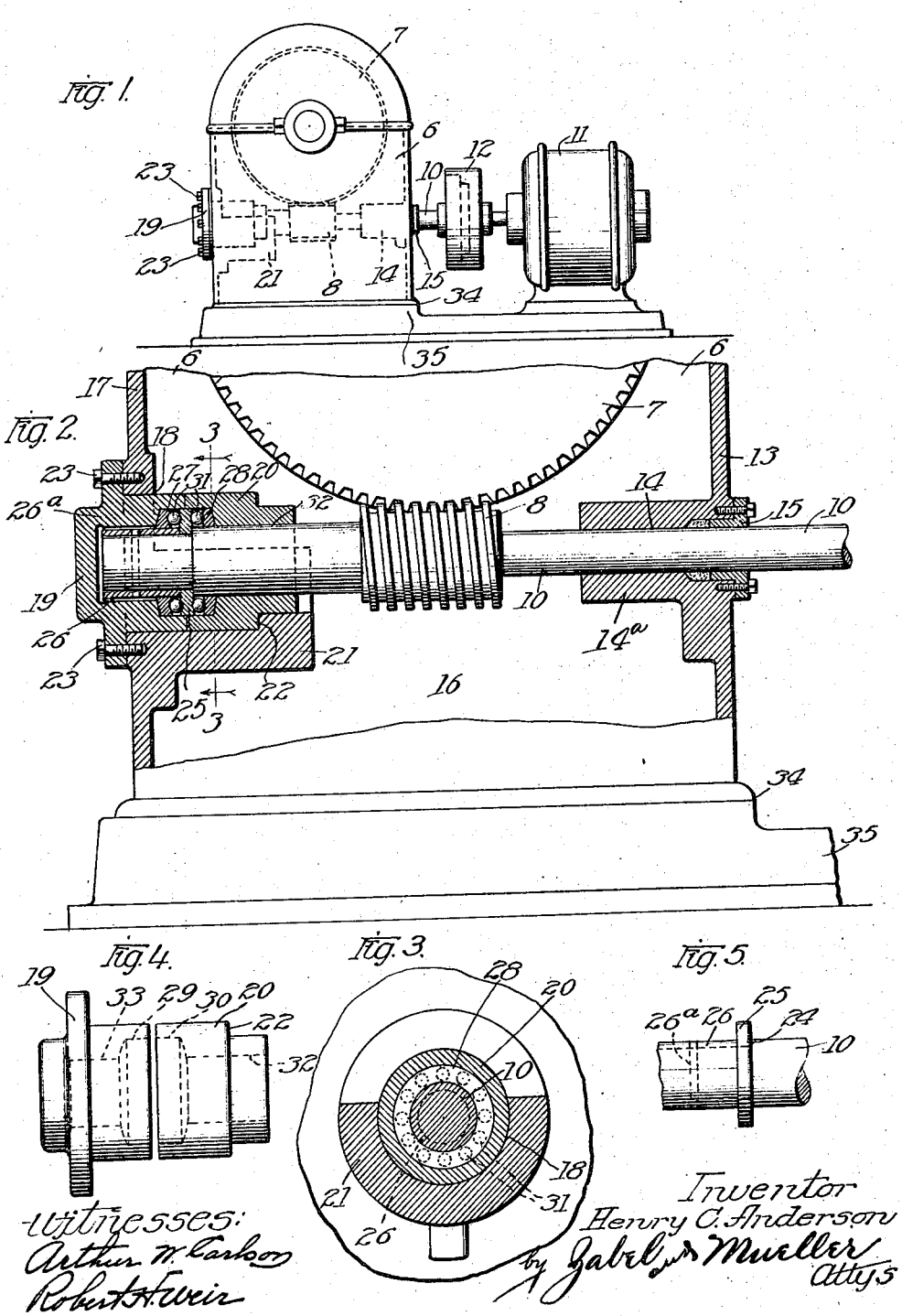
Inventor
Henry C. Anderson

UNITED STATES PATENT OFFICE.

HENRY C. ANDERSON, OF CHICAGO, ILLINOIS, ASSIGNOR TO RELIANCE ELEVATOR COMPANY, OF CHICAGO, ILLINOIS.

ELEVATOR.

1,413,886.   Specification of Letters Patent.   Patented Apr. 25, 1922.

Application filed May 10, 1918. Serial No. 233,623.

*To all whom it may concern:*

Be it known that I, HENRY C. ANDERSON, a citizen of the United States, residing at Chicago, in the county of Cook and State of Illinois, have invented a certain new and useful Improvement in Elevators, of which the following is a full, clear, concise and exact description, reference being had to the accompanying drawings, forming a part of this specification.

My invention relates to traction machines for elevators and has to do more particularly with the provision of a bearing construction in which the drum-driving shaft and its worm may be withdrawn from the frame or housing and in which but a single thrust bearing is provided for the worm shaft at one end and a plain bearing at the other end extending through a hub cast preferably integrally with the wall of the frame. Heretofore in traction machines for elevators the frame which carries the drum driving gear and worm was provided with an enlarged bearing or head at each end of the worm shaft, these bearings being set into openings in opposite walls of the frame with the shaft extending therethrough and an intermediately positioned worm thereon.

One of the features of my invention is the provision of a frame for elevator traction machines which carries a plain or straight simple bearing in an integral hub on one wall and a removable bearing in the other wall, preferably in the form of a double thrust bearing so as to take the thrust on the shaft in either longitudinal direction, the removable bearing being adaped to be withdrawn from the frame so that the shaft and its worm may be withdrawn from the frame or housing through the opening which supports the thrust bearing.

In prior machines of this character removable heads having bearings were provided in each wall of the machine. In machines of this kind the thrust is first in one direction as the shaft is rotated one way, and then the thrust is in the opposite direction as the shaft is reversed. In such prior machines this bearing construction has been quite expensive and one of the objects of my invention is to eliminate this expensive construction by providing a single thrust bearing in one wall and a plain aligned bearing in the opposite wall, the thrust bearing being preferably a double thrust bearing and removably supported so that the bearing shaft and worm may be withdrawn from the frame or housing.

For a better understanding of my invention reference is to be had to the accompanying drawing, in which like reference characters indicate like parts and in which:

Fig. 1 is a side elevation of a traction machine for elevators constructed in accordance with my invention;

Fig. 2 is a longitudinal sectional view through the shaft and bearing of the traction machine frame or housing;

Fig. 3 is a transverse section along the line 3—3 of Fig. 2;

Fig. 4 shows the split thrust bearing housing; and

Fig. 5 shows the preferred method of mounting the thrust bearing collar upon the shaft.

Referring now more particularly to the preferred form of my invention as illustrated, it comprises the usual frame or housing 6 which includes the drum worm gear 7 adapted to be driven in either direction by a worm 8 carried by the shaft 10 which is connected to a source of power in the nature of a motor 11, the shaft 10 and motor shaft being connected through a coupling in the brake drum 12. The frame or housing 6 has opposed bearing supporting walls, the wall 13 being provided preferably with a plain straight bearing 14 bored through a hub 14ª preferably cast integral with the wall, a packing nut 15 encircling the shaft 10 so as to prevent the escape of oil which is carried in the reservoir 16 for lubricating the bearings and gearing. The other wall 17 supports a removable bearing preferably in the form of a double thrust bearing which is also self-aligning, this thrust bearing being inserted through an opening 18 in the wall 17 which is bored in alignment with the bearing 14 in the opposite wall 13.

This thrust bearing includes a two part or split housing consisting of a cap portion 19 and inner or abutting portion 20 which parts slide into the bore in the hub 21. The inner bearing housing 20 has an abutting shoulder 22 which sets against a corresponding shoulder in the hub 21 so that when the cap portion 19 is clamped against the outer face of the wall 17 by means of the screws 23, the two portions 19 and 20 are clamped against rotation. The end of the shaft 10 which enters the thrust bearing is reduced so as to provide a shoulder 24 against which the thrust ring 25 abuts, this ring being rigidly supported by a sleeve 26 which slides over the reduced end of the shaft 10 and is held by means of a pin 26ᵃ. To accommodate the thrust ring and ball races 27, 28, enlarged recesses 29, 30 are provided in the adjoining ends of the housings 19, 20 respectively. The ball races 27, 28 are rounded upon their outer faces, that is, the faces opposite the bearing parts, and the recesses 29, 30 are correspondingly rounded so as to provide an automatic or self-aligning ball bearing. The ball bearings, it will be apparent, will take the thrust of the shaft regardless of the direction of thrust on account of the thrust ring 25 being secured to the shaft 10, and running between the opposed circular rows of bearing balls 31. The rotary bearing for the shaft 10 at the thrust end, is at 32 in the housing 20, the outer end of the shaft 10 along sleeve 26 running freely in the cap 19. That is there is a clearance between the sleeve 26 and the hole 33 in cap 19, as shown in Fig. 2. A slight enlargement is cut in the end of the hole 33 in the cap 19 simply to act as clearance for the end of the shaft.

In boring the aligned bearings or bearing supports in the opposed walls of the frame, the frame or housing, which is separated at 34 from the base 35, is fastened to the carriage of a suitable boring mill, as for instance a lathe, and the boring bar with suitable cutters inserted through the bearing openings in the walls of the housing. A plain or simple straight bearing 14 is bored through the hub on the wall 13 and an enlarged thrust bearing support 18 bored through the opposite wall 17, these holes being bored at one setting so as to be in perfect alignment. It will be apparent that with my preferred construction a considerable saving in expense is made over the prior method in which thrust bearings were provided in each of the opposed walls so as to take the thrust of the worm 18 in each direction. By my improved construction I eliminate one of these expensive bearings and provide a single bearing which may be readily removed from the one wall of the housing and the shaft and worm withdrawn from the housing through the opening in the wall which supports the thrust bearing.

In assembling the frame, shaft and bearing, the bearing housing 20 and ball race 28 are first slipped over the corresponding end of the shaft 10 after which the thrust ring 25 and the sleeve 26 are placed over the end of the shaft and the sleeve 26 secured end to by the pin 26ᵃ so as to rigidly hold the ring 25 in place. The cap 19 and ball race 27 are now slipped over the end of the shaft and the balls 31 inserted after which the bearing housings 19 and 20 are drawn together upon the shaft, the whole thing being then inserted through the bearing support opening in the wall 17 and the clamping screws 23 drawn up until the shoulder 22 of the housing 20 abuts the corresponding shoulder in the hub. The screws 23 are then drawn up tight so as to securely hold the members 19 and 20 against rotation. The packing nut 15 may then be placed in position on the other end of the shaft 10 so as to prevent the escape of oil from the reservoir 16.

For the purpose of illustrating my invention I have shown a preferred form but it is to be understood that changes and modifications will readily occur to those skilled in the art and therefore I do not desire to be limited to the exact structure as shown and described but aim to cover all that comes within the spirit and scope of the appended claims.

Having thus described my invention, what I claim as new and desire to secure by Letters Patent is:

1. A device of the character described comprising a frame, a plain bearing formed on one wall of the frame, a thrust bearing mounted on the opposite wall of the frame, a shaft mounted in said bearings, a shoulder on the shaft, a thrust ring adjacent said shoulder, a sleeve rigidly secured to the ring and keyed to the shaft and ball bearings contained within the thrust bearing and adapted to engage the opposite faces of said thrust ring.

2. In a device of the character described the combination of a frame, a plain bearing formed in one wall of the frame, a hub formed on the opposite wall of the frame, a thrust bearing supported by said hub and a shaft mounted in said bearings, said thrust bearing comprising a separable housing, comprising a cap piece and a rotary bearing portion having rounded recesses and ball races having rounded portions adapted to fit said rounded recesses, said cap piece being spaced from said shaft and a thrust ring secured to the shaft positioned between the races and ball bearings between the ring and the races.

3. A device of the character described comprising a frame, a plain bearing formed on one wall of the frame, a thrust bearing mounted on the opposite wall of the frame, a shaft mounted in said bearings, a shoulder on the shaft, a thrust ring adjacent said shoulder, a sleeve mounted on the shaft and keyed to the shaft for holding said thrust ring against said shoulder, self-alining ball races contained within the thrust bearing and ball bearings positioned between said ball races and said thrust ring and adapted to engage the opposite faces of the thrust ring.

4. A device of the character described comprising a frame, a hub formed on the frame, a shoulder on said hub, a bearing positioned against said shoulder, a cap piece positioned in said hub, ball races formed in said bearing and cap piece, a shaft mounted in said bearing, a thrust ring rigidly connected to said shaft and ball bearings positioned between said ball races and said thrust ring and adapted to engage the opposite faces of said thrust ring.

5. A traction device for elevators comprising a frame having a plain bearing at one end and a thrust bearing at the other end, a shaft mounted in said bearing and having an intermediately disposed gear adapted when driven to effect an end thrust on the shaft, and a thrust ring immovably secured to said shaft, said thrust bearing comprising separable portions having rounded recesses and ball races having rounded portions adapted to fit said rounded recesses and ball bearings positioned between said ball races and said thrust ring on both sides of said thrust ring.

6. A thrust bearing comprising a hub having a shoulder formed thereon, a bearing portion supported by the hub and positioned against said shoulder, a cap piece having an extension adapted to engage said bearing portion, said extension being supported by the hub and means for moving the cap piece relatively to the hub to clamp said bearing portion against said shoulder.

7. A device of the character described comprising a frame, a plain bearing formed on one wall of the frame, a hub formed on the other wall of the frame in alinement with said plain bearing, and a thrust bearing supported by said hub, said thrust bearing comprising separable portions, rounded recesses in said separable portions, ball races having rounded faces adapted to engage said rounded recesses, a shaft supported in said bearings and a thrust ring secured to said shaft and positioned between said ball races and ball bearings positioned between said ball races and the opposite faces of said thrust ring.

8. A device of the character described comprising a frame, a plain bearing, formed on one wall of said frame, a two-part thrust bearing formed on the other wall of said frame, a shaft supported on said plain bearing and one of the parts of said thrust bearing, a thrust ring secured to the shaft and self aligning ball bearings contained within the thrust bearing and interposed between the two parts of said bearing and the thrust ring.

9. A traction machine for elevators comprising a frame having a bearing at each end thereof, a shaft in said bearings having an intermediately disposed gear adapted when driven to effect an end thrust on the shaft, one of said bearings being a plain bearing integral with one of the end walls of said frame, and the other of said bearings being a double thrust bearing removably supported in an orifice in the other end wall of said frame, whereby said shaft and gear may be withdrawn through the said orifice to remove said shaft from said bearings.

10. A traction machine for elevators comprising a frame having opposed bearing supporting walls, a plain bearing and a bearing supporting member formed on said walls, a removable double thrust bearing mounted in an orifice bored in one of said walls and resting on said bearing supporting member, a shaft having an intermediately disposed gear mounted in said thrust bearing and in a bore extending through said plain bearing and the other wall of said frame, whereby said thrust bearing may be removed to permit withdrawal of the shaft and gear from the frame through said orifice.

In witness whereof I hereunto subscribe my name this 23rd day of April, A. D. 1918.

HENRY C. ANDERSON.